March 20, 1951        J. R. WRATHALL        2,546,024
CONTROL SYSTEM FOR CUTTING APPARATUS
Filed April 28, 1948
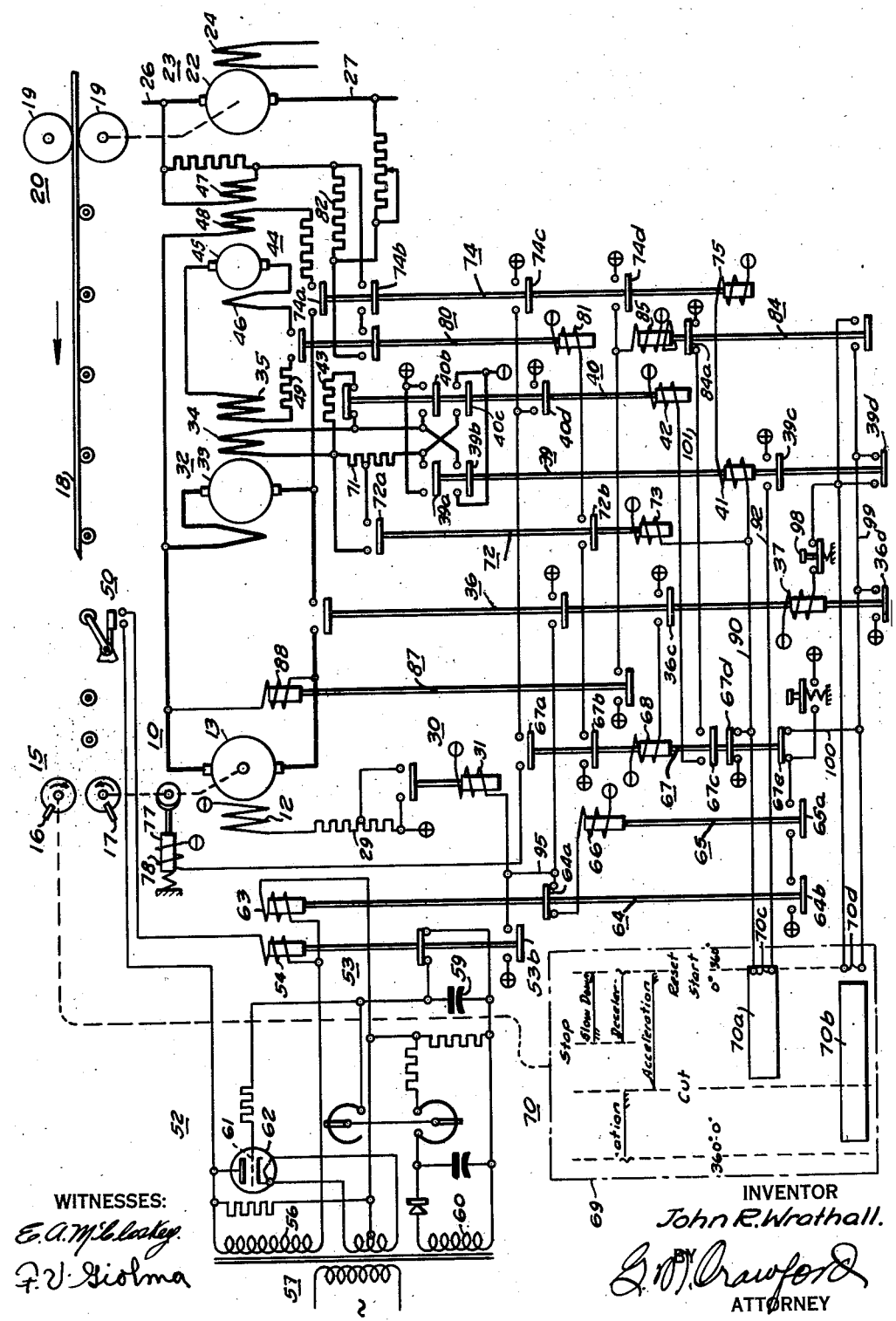
WITNESSES:
INVENTOR
John R. Wrathall.
BY
ATTORNEY

UNITED STATES PATENT OFFICE 2,546,024

CONTROL SYSTEM FOR CUTTING APPARATUS

John R. Wrathall, East Aurora, N. Y., assignor to Westinghouse Electric Corporation, East Pittsburgh, Pa., a corporation of Pennsylvania Application April 28, 1948, Serial No. 23,677

15 Claims. (Cl. 164—68)

My invention relates, generally, to control systems for cutting apparatus, and it has reference, in particular, to a control system for a flying crop shear, or the like, such as may be used for making cuts on the crop end of a length of moving material in strip or rod form as it is delivered by a mill stand or other work device.

Generally stated, it is an object of my invention to provide a control system for cutting apparatus which is simple and inexpensive to manufacture, and which is easy to operate.

More specifically, it is an object of my invention to provide an automatic control system for operating a shear through a single cutting cycle to cut the crop end of a length of material as it proceeds from a mill stand, or the like.

Another object of my invention is to provide, in a control system for a crop shear, for rapidly accelerating the shear motor so as to perform a cutting operation on a length of material in a single cutting cycle of the shear, stopping the motor, and returning the shear to a predetermined initial starting position before it makes a second cut.

Yet another object of my invention is to provide for utilizing a regulating generator to control the energization of a shear motor in accordance with the speed of a mill or other work device with which the shear is disposed to function.

It is also an object of my invention to provide, in a control system for a shear motor, for conditioning the setting means of the brake before the shear makes a cut, so as to bring the shear to a stop before it makes a second cut.

An important object of my invention is to provide for using a crop shear which starts from a predetermined initial position and makes a cut in its first revolution, and for stopping the shear and returning it accurately to the initial position.

Another important object of my invention is to provide for actuating a shear in timed relation to the movement of a material which is to be sheared.

It is an important object of my invention to provide for increasing the field strength of a shear motor a predetermined interval of time before a cut is made so as to insure high motor torque for accelerating the shear.

Still another object of my invention is to provide for energizing the field windings of a regulating generator before it is connected to control the operation of a shear motor, so as to minimize the time delay occasioned in accelerating the shear to cutting speed.

Yet another important object of my invention is to provide for rapidly accelerating a rotary shear to a substantially constant speed and making a cut on a length of moving material in less than one revolution, and then stopping the shear before it completes a second revolution and returning it slowly and accurately to an initial starting position.

Other objects will in part be obvious, and will in part be explained hereinafter.

In practicing my invention in one form thereof which may be utilized for driving and automatically controlling the operation of a rotary or flying shear for making cuts on the crop end of a length of moving material and which has blades which cooperate once in each revolution or cycle to make a cut, the shear is driven by a motor connected thereto in any suitable manner. The motor armature winding is energized from a main generator which has one field winding normally energized to provide a reduced output voltage, and a regulating field winding disposed to be energized from a regulating generator which is responsive to the bus voltage from which the mill is supplied. A flag switch actuated by the moving material initiates the operation of a timer which sets up a control sequence whereby the field strength of the shear motor is increased, the armature winding of the shear motor is connected to the main generator, a brake on the shear is released, and the regulating generator is connected to energize the regulating winding. A limit switch connected in driving relation with the shear varies the control sequence so as to reduce the output voltage of the main generator and condition the setting means of the brake just before a cut is made. When the shear has made a cut and passed through its initial position, the polarity of the main generator is reversed, so as to return the shear slowly to its initial position, wherein it is stopped by the limit switch, which interrupts the control sequence.

For a more complete understanding of the nature and scope of my invention, reference may be made to the following detailed description, which may be read in connection with the accompanying drawing, in which the single figure is a diagrammatic view of a control system for a shear motor embodying the invention in one of its forms.

Referring to the drawing, the reference numeral 10 may denote, generally, a motor having a field winding 12, and an armature 13, which may be connected in driving relation with a flying or rotary shear 15 of known construction comprising rotating blades 16 and 17, which are operable to crop the end of a length of material such as a rod 18 which proceeds from between the rolls 19 of a mill stand 20.

The rolls 19 may be driven in any suitable manner, being, for example, connected in driving relation with the armature 22 of a mill motor 23 having a field winding 24. The field winding 24 may be energized from a suitable source of electrical energy (not shown), while the winding of the armature 22 may be connected to a suitable variable voltage power source by means of conductors 26 and 27 so as to provide for varying the speed of the mill in a well known manner.

The field winding 12 of the shear motor 10 may be connected to a suitable source of electrical energy in circuit relation with a control resistor 29 which may have associated therewith a field relay 30 having an operating winding 31 for shunting a portion of the resistor to increase the energization of the field winding. The winding of the armature 13 of the motor may be supplied with electrical energy from a main generator 32 comprising an armature 33 having an armature winding, a main field winding 34 and a regulating field winding 35. The winding of the armature 33 may be connected to the winding of the armature 13 of the motor by means of a main switch 36 having an operating winding 37. The field winding 34 may be connected to a suitable source of electrical energy through "Forward" and "Reverse" control relays 39 and 40, having operating windings 41 and 42, respectively. A field discharge resistor 43 may be provided to time the decay of the generator field strength and limit regenerative current in the motor 10.

In order to provide for regulating the output of the main generator 32, the regulating field winding 35 may be supplied with electrical energy from an auxiliary regulating generator 44 comprising an armature 45 having a winding, a series field winding 46, a pattern field winding 47 and a control field winding 48.

The series field winding 46 may be connected in circuit relation with the windings of armatures 45 and 33, and a resistor 49 which tunes the circuit so that the magnetomotive force of the winding 46 substantially compensates for the air gap magnetomotive force losses of the auxiliary regulating generator. The pattern field winding 47 may be energized from the conductors 26 and 27 in accordance with the voltage applied to the armature of the mill motor 23. The control field winding 48 may be disposed to be connected across the armature of the main generator 32 so as to be energized in accordance with the voltage applied to the armature of the shear motor 10. The field winding 48 may be connected differentially with respect to the pattern field winding 47.

In order to provide for initiating the operation of the shear 15, means such as the flag switch 50 may be provided. The flag switch 50 may be so positioned as to be engaged by the leading end of the rod 18 as it proceeds from the stand 20 toward the shear 15.

To provide for operating the shear in timed relation with rod 18, time delay means 52 may be provided for effecting operation of the shear at different predetermined intervals of time after the flag switch 50 is actuated, so as to accommodate different speeds of the mill 20. The time delay means 52 may be of a suitable electronic type well known in the art comprising, for example, a control relay 53 having an operating winding 54 which may be energized from the secondary winding 56 of a control transformer 57 as soon as the flag switch 50 closes. Operation of the control relay 53 removes a shunt from a capacitor 59 and permits it to be charged from a tertiary winding 60 of the control transformer so as to remove a negative bias from the grid 61 of a discharge valve 62 which becomes conductive after a predetermined interval of time and energizes the operating winding 63 of a timing relay 64. The timing relay 64 may be utilized to provide an operating circuit for the operating winding 37 of the main switch 36 so as to start the shear motor 10. An auxiliary timing relay 65 having an operating winding 66 may be utilized in conjunction with the relays 53 and 64 to provide a control impulse of predetermined duration. An auxiliary control relay 67 having an operating winding 68 may be provided for furnishing an initiating circuit for the main switch 36.

A limit switch 70 may be provided in conjunction with a resistor 71 and a slow-down relay 72 having an operating winding 73, for weakening the energization of the main field winding 34 of the main generator a predetermined interval of time before the shear 15 makes a cut, so as to commence the stopping of the shear. The limit switch 70 may be of any suitable type comprising, for example, a rotatable drum 69 connected in driven relation with the shear 15 as represented by the dotted connecting line 76, and having contact segments 70a and 70b disposed to engage stationary contact members 70c and 70d as shown.

A brake control relay 74 having an operating winding 75 may be provided for controlling the operation of a brake device 77 having an operating winding 78, for bringing the shear to a rapid stop.

In order to provide for rapidly accelerating the shear motor 10. An auxiliary switch 80 having an operating winding 81 may be provided for connecting the regulating generator 44 to the regulating field winding 35 of the main generator. The regulating generator 44 may thus be maintained in an energized condition, and connected to the field winding 35 upon operation of the switch 80 so as to eliminate the usual time delay required for build-up of the regulating generator. The auxiliary switch 80 may also be utilized to control the connection of a control resistor 82 in the pattern field circuit for varying the output voltage of the regulating generator.

For the purpose of reversing the shear motor after a cut has been made, so as to return it accurately to the predetermined initial position from which it started, a time delay relay 84 having an operating winding 85 may be utilized. A voltage relay 87, having an operating winding 88 connected across the armature of the motor 10, may be provided for maintaining the time delay relay 84 in the energized position until the voltage of the main generator 32 is reduced to a predetermined value of about 25% of normal value, whereupon the time delay relay may be effective after a predetermined delay to connect the operating winding 42 of the "reverse" relay 40 for energization, so as to reverse the output voltage of the main generator.

In operation, the slow-down relay 72, the "forward" relay 39 and the brake control relay 74 will normally be in the energized position as soon as the control circuit is energized, since the operating winding 73 and the series circuit of the windings 41 and 75 will be energized in parallel circuit relation over an obvious circuit extending through the normally closed contact member 67d of the auxiliary control relay 67. A holding circuit will be provided for these relays through a circuit extending from their operating windings through conductor 90, contact members 70c of the limit switch 70, conductor 92, and contact members 39c of the "forward" relay to the positive terminal of the control source.

Operation of the brake control relay 74 provides an operating circuit for the time delay 84 through contact members 74d. The control field winding 48 of the regulating generator 44 is connected across the armature of the main generator 32 through contact members 74a of the brake control relay. The pattern field winding 47 is already connected between the conductors 26 and 27 which supply electrical energy to the mill motor 23, but the energization thereof is maintained at a reduced value by reason of contact members 80b of the auxiliary switch 80 being open, and control resistor 82 connected in circuit relation with the pattern field winding 47.

When the rod 18 engages the flag switch 50, control relay 53 of the time delay means 52 operates, and a time delay interval for initiating operation of the shear motor 10 is commenced. Operation of the control relay 53 provides an obvious energizing circuit for the operating winding 31 of the field relay 30 through contact members 53b, so that the energization of the field winding 12 of the shear motor is increased to provide the maximum accelerating torque for the motor. At the same time, an energizing circuit is provided for the auxiliary timing relay 65 extending from positive through contact members 53b, conductor 95, normally closed contact members 64a, and operating winding 66 to negative.

At the end of the predetermined timing interval, which is governed by the time required for the capacitor 59 to charge to a sufficient value to overcome the negative bias of the grid 61, the timing relay 64 operates. An energizing circuit is thereby provided for the operating winding 37 of the main switch 36, extending from negative through the operating winding 37, manual "stop" push-button switch 98, contact members 39d, conductors 99 and 100, contact members 67e, contact members 65a and contact members 64b to positive. The main switch 36 thereupon operates, and connects the armature 13 of the shear motor across the armature 33 of the main generator. At the same time, an energizing circuit is provided for the operating winding 68 of the auxiliary relay 67 through contact member 36c of the main switch. A holding circuit for the main switch 36 is provided through contact members 36d and 39d, while the auxiliary relay 67 provides an energizing circuit for the operating winding 81 of the auxiliary switch 80 through contact members 67b, and completes an energizing circuit for the operating winding 78 of the brake device through contact members 67a. Operation of the auxiliary switch 80 connects the regulating generator 44 to the regulating field winding 35, and provides for shunting the control resistor 82 to increase the energization of the pattern field winding 47.

The shear motor 13 accelerates, rotating the shear blades 16 and 17 in clockwise and counterclockwise directions, respectively. After about 15° shear travel, contact members 70d of the limit switch provides a holding circuit for the main switch 36. As soon as the limit switch 70 reaches a position just prior to the cutting position, which may, for example, occur after about 220° to 270° rotation of the shear from the initial positions, the circuit through contact members 70c will be interrupted. This interrupts the energizing circuits for the operating windings 73, 41 and 75 of the slowdown relay 72, the "forward relay" 39 and the brake control relay 74, respectively. These relays accordingly return to the deenergized positions.

The main field winding 34 of the main generator is thereupon deenergized by the return of the forward relay 39 to the deenergized position, by reason of the opening of contact members 39a and 39b. At the same time, the resistance of the field circuit is increased by reason of the opening of contact members 72a, so as to provide for subsequent reduced output voltage of the main generator, and slowdown of the shear motor, when reversing the shear motor. Deenergization of the brake control relay 74 interrupts the energizing circuit for the operating winding 78 at contact members 74c, so that the brake device 77 operates to start slowing the shear. The opening of contact members 74a and 74b disconnects the control field winding of the regulating generator 44 and reduces the energization of the pattern field winding 47. At the same time, the auxiliary switch 80 is returned to the deenergized position by reason of the opening of contact members 72b in the energizing circuit of the operating winding 81. This disconnects the regulating generator from the regulating field winding 35 of the main generator.

The shear blades 16 and 17 continue to rotate and cut off the leading end of the rod 18, rotating some 180° to 270° past the cutting point before they are stopped. While the time delay relay 84 is deenergized by the opening of the voltage relay 87 when the output voltage of the main generator is reduced to a predetermined value, it remains in the energized position during the interruption of the energizing circuit through contact members 70d of the limit switch, while the limit switch is still rotating with the shear 15 in the forward direction.

After a predetermined time delay, the time delay relay 84 returns to the deenergized position. An energizing circuit is thereupon provided for the "reverse" relay 40, extending from negative, through the operating winding 42, contact members 67c, conductor 101 and contact members 84a. The "reverse" relay 40 thereupon operates and connects the main field winding 34 of the main generator 32 to the source through contact members 40b and 40c.

Since the field limiting resistor 71 is connected in circuit relation with the field winding 34, the output voltage of the main generator will be reduced, and the shear motor 10 will be operated at a reduced speed. Operation of the "reverse" relay 40 provides an energizing circuit for the operating winding 78 of the brake device through contact member 40d, so that the brake is released to permit reversal of the shear.

When the shear reaches the predetermined initial position from which it started, the circuit through contact members 70d will be interrupted. This interrupts the energizing circuit for the main switch 36, which extended through contact members 70d, so that the main switch opens. The armature 13 of the shear motor is thereupon disconnected from the main generator.

The energizing circuit for the operating winding 68 of the auxiliary relay 67 is interrupted at contact members 36c, so that the auxiliary relay returns to the deenergized position and deenergizes the operating winding 42 of the "reverse" relay 40. At the same time the auxiliary relay interrupts the energizing circuit for the operating winding 78 of the brake at contact members 67a, so that the brake operates, and stops the shear in the predetermined initial position.

Upon the return of the auxiliary relay 67 to the deenergized position, an energizing circuit is again provided for the operating windings 73, and 41 and 75 of the slowdown relay 72, and the "forward" and brake control relays 39 and 74. This restores the system to the initial operating condition ready for a subsequent operation.

From the above description and the accompanying drawing, it will be apparent that I have provided in a simple and effective manner for controlling the operation of a shear of the type which is disposed to cut once in each and every revolution, and which must, therefore, be accelerated rapidly to cut in less than one revolution, and then be brought to a stop and returned to its initial position. By providing for energizing the field windings of the regulating generator before the shear is to be actuated, the delay normally encountered in building up the fields of the regulating generator is eliminated. By maintaining the main generator with its main field winding already energized, a high motor starting torque may be produced. Forcing of the main generator by the regulating generator contributes to the rapid acceleration of the shear motor. Rapid stopping of the shear is effected by conditioning the setting means of the brake before the cut is actually made, and by reducing the generator field strength and weakening the pattern field of the regulating generator. The latter results in regenerative braking which assists the mechanical brake in rapidly stopping the shear before a second cut is made. By reversing the shear with a reduced field on the main generator, accurate positioning of the shear during stopping is obtained. Since the whole operating cycle of the shear is contained in little more than one revolution thereof, it will be seen that the features of rapid acceleration and deceleration are of the utmost importance.

Since certain changes may be made in the above-described construction, and different embodiments of the invention may be made without departing from the spirit or scope thereof, it is intended that all the matter contained in the above description and shown in the accompanying drawing shall be considered as illustrative and not in a limiting sense.

I claim as my invention:

1. In a drive for cutting apparatus disposed to cut moving material, a motor disposed to be connected in driving relation with the cutting apparatus, circuit means disposed to supply electrical energy to the motor, control means operable in response to movement of the material to connect the motor to said circuit means for effecting a cutting operation, and a limit switch disposed to be operable in response to movement of the cutting apparatus to effect a reduction in the voltage of the circuit means an instant before a cut is made to initiate stopping of the cutting apparatus.

2. In cutting apparatus in combination with cutting means for a moving material, a motor connected in driving relation with the cutting means, generating means including a regulating generator disposed to supply electrical energy to the motor, switch means connecting the generating means for supplying electrical energy to the motor, control means including a switch actuated by the moving material and time delay means responsive to actuation of said switch connected to effect operation of the switch means to start the motor, reversing means operable to reverse the polarity of the generating means, a limit switch connected in driving relation with the cutting means to provide an operating circuit for said switch means, said limit switch being disposed to interrupt said operating circuit when the cutting means reaches a predetermined position, and additional time delay means disposed to provide an auxiliary operating circuit for the switch means during forward operation of the motor and then effect operation of the reversing means.

3. A drive for a shear comprising, a motor disposed to be connected in driving relation with the shear, generating means for supplying electrical energy to the shear motor, switch means operable to connect the shear motor to the generating means, brake means operable to stop the motor and shear, reversing means operable to reverse the polarity of the generating means and release the brake means, control means responsive to movement of a length of material operable to effect operation of the switch means, a limit switch connected in driving relation with the shear motor, said limit switch being disposed to provide for completing an operating circuit for the switch means except when in a predetermined initial position, and relay means providing an auxiliary operating circuit for the switch means in response to predetermined energization of the shear motor, said relay means being disposed to effect operation of the reversing means a predetermined time after the energization of the shear motor is reduced below the predetermined value.

4. In a drive for a shear disposed to be actuated from a predetermined initial position to cut a length of moving material proceeding from a work feeding device energized from a variable voltage source, the combination of a motor connected in driving relation with the shear, generating means including a regulating generator responsive to the voltage applied to the work feeding device, switch means operable to connect the generating means and the shear motor, and control means including a limit switch connected in driving relation with the shear and reversing means operable under the control of the limit switch connected to sequentially start the shear motor to make a cut of the material, reverse it before a second cut is made and stop it in the predetermined initial position.

5. In a control system for a motor having a field winding and a winding on an armature disposed in driving relation with a shear, circuit means connecting the field winding to a source of electrical energy including field control means operable to increase the energization of the field winding, generating means disposed to be normally maintained in an energized condition, switch means operable to connect the winding of the shear motor armature to the generating means and effect an increase in the output of the generating means, control means operable in response to the movement of material to be sheared to provide an operating circuit for the switch means during a predetermined portion of one rotation of the shear, a limit switch disposed to open the operating circuit when the shear is in a predetermined position in said one rotation, said limit switch being connected in driving relation with the shear and disposed to provide for reducing the voltage of the generating means in a predetermined position of the shear, reversing means operable to reverse the polarity of the generating means, and time delay means operable to effect operation of the reversing means to return the shear to said predetermined position.

6. A drive for a shear disposed to cut a length of moving material once in each revolution comprising, a motor connected in driving relation with the shear, generating means including a main generator having a plurality of field windings, reversing means normally connecting one of the field windings to a source of electrical energy for energization in one sense, a regulating generator disposed to be normally maintained in an energized condition, switch means operable to connect the regulating generator to energize another of the main generator field windings cumulatively with respect to said one field winding, additional switch means operable to connect the generating means to supply electrical energy to the shear motor, control means operable to effect closing of said switch means and said additional switch means to start the shear motor, limit switch means operable in accordance with the movement of the shear to effect opening of said switch means at a predetermined position of the shear in one revolution, time delay means responsive to a reduction in the voltage applied to the shear motor to effect operation of the reversing means, and brake means responsive to operation of the reversing means to stop the shear in substantially its initial position.

7. In a control system for a shear normally disposed in a predetermined initial position and actuable to cut once in each revolution, a motor connected in driving relation with the shear, a main generator having a plurality of field windings, reversing means normally connecting one field winding to a source of electrical energy in one sense, a main switch operable to connect the main generator to the motor, a normally energized auxiliary generator, an auxiliary switch operable to connect the auxiliary generator to energize another of the main generator field windings, control means operable in response to movement of a length of material to be cut to effect closing of the main and auxiliary switches, a limit switch operable in response to rotation of the shear to effect opening of the auxiliary switch to reduce the output voltage of the main generator, and time delay means responsive to reduction of the main generator voltage to effect operation of the reversing means after the shear passes through the predetermined initial position and before it makes another cut, said limit switch being operable to effect opening of the main switch when the shear returns to the predetermined initial position.

8. A control system for a motor having a field winding and a winding on an armature connected in driving relation with a rotary shear for cutting moving material comprising, generating means including a main generator and an auxiliary generator responsive to the voltage applied to a mill working on material to be cut by the shear, switch means operable to connect the winding of the shear motor armature to the main generator, circuit means connecting the field winding of the motor to a source of electrical energy, field control means normally limiting the energization of the motor field winding, control means including a flag switch disposed to be actuated in response to movement of the material toward the shear, and time delay means operable to effect operation of the field control means to increase the energization of the motor field winding and operation of the switch means in timed sequence to start the shear motor, auxiliary switch means operable to connect the auxiliary generator to increase the field excitation of the main generator, limit switch means operable in accordance with rotation of the shear to effect disconnection of the auxiliary generator to reduce the field excitation of the main generator, and reversing means operable in response to a predetermined reduction of the main generator voltage to reverse the polarity of the main generator to return the shear to a predetermined position.

9. In cutting apparatus, the combination with a shear, of a motor connected in driving relation with the shear, switch means operable to effect energization of the motor to start the shear, limit switch means responsive to movement of the shear operable just before a cut is made to reduce the energization of the motor, and positioning means including brake means and reversing means responsive to operation of the limit switch means and reduction of the energization of the motor operable to return the shear to a predetermined initial position.

10. The combination with a shear disposed to make a cut on moving material once in each revolution, of a motor connected in driving relation with the sheer, circuit means normally providing reduced field excitation for the motor, a main generator having a normal reduced value of field excitation, control means operable to effect connection of the motor and generator and to increase the field excitation thereof, limit switch means operable immediately before a cut is made to effect a reduction of the generator field excitation, and reversing means responsive to reduction of the field excitation to reverse the polarity of the main generator to return the shear to a predetermined initial position.

11. In cutting apparatus, the combination with cutting means, of a motor connected in driving relation with the cutting means, generating means, switch means operable to connect the generating means to supply electrical energy to the motor, control means responsive to the movement of a length of material to be cut to effect operation of the switch means, brake means disposed to be released in response to operation of said switch means, reversing means operable to reverse the polarity of the generating means, a limit switch responsive to movement of the cutting means to effect a reduction in the output of the generating means and operation of the brake means, reversing means operable in response to a predetermined reduction in the output of the generating means to reverse the polarity of the output and release the brake means, said reversing means being responsive to operation of the limit switch to a predetermined position to effect operation of the brake means.

12. The combination with cutting apparatus for moving material including cutting means having a driving motor provided with an armature winding an a field winding, of a main generator having a pair of field windings, reversing means normally connecting one of said field windings to a source of electrical energy to produce an output voltage of one polarity, a regulating generator having pattern and control field windings, circuit means connecting the pattern and control field windings for energization, auxiliary switch means operable to connect the regulating generator to energize another of the main generator field windings, main switch means operable to connect the main generator in circuit relation with the motor armature winding, circuit means connecting the motor field winding to a source of electrical energy including field control means operable to increase the energization of said field winding, control means responsive to movement of the material to be cut including time delay means operable to effect operation of the field control means and the main and auxiliary switch means in timed relation, a limit switch actuable in accordance with the position of the cutting means to effect a reduction in the energization of said one of the main generator field windings and the opening of the auxiliary switch means, and relay means responsive to a predetermined reduction in the main generator voltage to effect operation of the reversing means to reverse the polarity of the main generator.

13. In cutting apparatus, the combination with cutting means comprising a pair of rotatable members having projecting blades disposed to cooperate once in each rotation to cut a length of moving material, of a motor connected in driving relation with said members, brake means operable to stop rotation of said members, generating means, reversing means controlling the polarity of the generating means disposed to provide normally for a polarity for effecting forward rotation of the motor, main switch means operable to connect the generating means to supply electric energy to the motor, control means responsive to movement of a material to be cut to effect operation of the main switch means, limit switch means responsive to movement of the rotatable members, relay means responsive to predetermined movement of the limit switch means to reduce the output voltage of the generating means, and time delay means responsive to reduction of the voltage of the generating means to effect operation of the reversing means to reverse the polarity of the generating means after a predetermined time.

14. A drive for cutting apparatus disposed to cut a length of moving material comprising, a motor disposed to be connected in driving relation with said cutting apparatus, generating means including a main generator having a plurality of field windings, circuit means connecting one of said field windings to provide an initial reduced main generator output voltage, a regulating generator disposed to be maintained in a reduced energized condition, switch means operable to connect the regulating generator to energize another of said field windings cumulatively with respect to said one field winding and to increase the output voltage of the regulating generator, additional switch means operable to connect the main generator to effect energization of the motor, control means including a flag switch responsive to movement of the material connected to effect operation of the switch means and additional switch means, and a limit switch disposed to be actuated by the cutting apparatus to effect deenergization of said one main generator field winding and reduce the output voltage of the regulating generator to decelerate the motor.

15. In a drive for a crop end shear disposed to cut a moving length of material, a motor disposed to be connected in driving relation with the shear, a main generator having a plurality of field windings, circuit means connecting one of said field windings to provide an initial reduced operating voltage, a regulating generator, main switch means operable to connect the main generator to the motor, additional switch means operable to connect the regulating generator to another of said main generator field windings, control means operable in response to movement of the material toward the shear to effect operation of the main and additional switch means to increase the main generator voltage and effect rapid acceleration of the motor, brake setting means, and limit switch means disposed to be connected in driving relation with the shear so as to operate just before a cut is made to effect operation of the brake setting means and effect a reduction of the main generator voltage so as to decelerate the motor.

JOHN R. WRATHALL.

REFERENCES CITED

The following references are of record in the file of this patent:

UNITED STATES PATENTS

| Number | Name | Date |
| --- | --- | --- |
| 1,970,445 | Ellis | Aug. 14, 1934 |
| 2,193,259 | Sheperdson | Mar. 12, 1940 |